(12) United States Patent
Moon et al.

(10) Patent No.: US 12,045,468 B2
(45) Date of Patent: Jul. 23, 2024

(54) STORAGE DEVICES CONFIGURED TO OBTAIN DATA OF EXTERNAL DEVICES FOR DEBUGGING

(71) Applicant: Samsung Electronics Co., Ltd., Suwon-si (KR)

(72) Inventors: Dongouk Moon, Seongnam-si (KR); Hyunjoon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 18/046,478

(22) Filed: Oct. 13, 2022

(65) Prior Publication Data

US 2023/0152984 A1 May 18, 2023

(30) Foreign Application Priority Data

Nov. 12, 2021 (KR) .......................... 10-2021-0156074
May 11, 2022 (KR) .......................... 10-2022-0057754

(51) Int. Cl.
  *G06F 11/07* (2006.01)
  *G06F 3/06* (2006.01)
(52) U.S. Cl.
  CPC .......... *G06F 3/0619* (2013.01); *G06F 3/0659* (2013.01); *G06F 3/0679* (2013.01); *G06F 11/0727* (2013.01); *G06F 11/0778* (2013.01)
(58) Field of Classification Search
  CPC .......................... G06F 11/0727; G06F 11/0778
(Continued)

(56) References Cited

U.S. PATENT DOCUMENTS 8,725,932 B2   5/2014 Yano et al.
2002/0056063 A1*  5/2002 Nerl ...................... G06F 1/3203
                                                711/170
(Continued)

FOREIGN PATENT DOCUMENTS

JP   2007219846 A   8/2007
JP   2010146072 A   7/2010
(Continued)

OTHER PUBLICATIONS

NVM Express™ Management Interface, Revision 1.1a, Apr. 20, 2020, 153 pages.
(Continued)

*Primary Examiner* — Chae M Ko
(74) *Attorney, Agent, or Firm* — Myers Bigel, P.A.

(57) ABSTRACT

A storage device includes a nonvolatile memory device (NVM) and a storage controller. The NVM includes a first region configured to store user data and a second region not allocated to a user. The storage controller is configured to be connected with a host device through both a first-type bus and a second-type bus different from the first-type bus. The storage controller is configured to receive a first and second request from the host device through the first-type bus. In response to the first request, the storage controller is configured to perform an operation on the NVM. In response to the second request, the storage controller is configured to store first data associated with the storage device in the second region and access the second-type bus to obtain second data of at least one external device obtained by the host device and store the second data in the second region.

20 Claims, 14 Drawing Sheets

(58) Field of Classification Search
USPC .................................................. 714/6.11, 2
See application file for complete search history.

(56) References Cited

U.S. PATENT DOCUMENTS

| | | | |
|---|---|---|---|
| 2005/0002384 A1* | 1/2005 | Larson ................ | G06F 13/4291 370/360 |
| 2005/0125199 A1* | 6/2005 | Slaight .................. | G05D 27/02 702/186 |
| 2013/0111298 A1* | 5/2013 | Seroff .................... | G06F 3/064 711/E12.008 |
| 2013/0198310 A1 | 8/2013 | Higashiyama | |
| 2015/0178095 A1* | 6/2015 | Balakrishnan ........ | G06F 13/364 710/110 |
| 2016/0117461 A1* | 4/2016 | Yeh ....................... | G16H 40/40 705/2 |
| 2018/0373233 A1 | 12/2018 | Goto | |
| 2019/0196898 A1 | 6/2019 | Sekiguchi et al. | |
| 2019/0272012 A1 | 9/2019 | Kachare et al. | |
| 2020/0013476 A1 | 1/2020 | Konan et al. | |
| 2021/0357125 A1* | 11/2021 | Mendes .............. | G06F 13/4004 |

FOREIGN PATENT DOCUMENTS

| | | |
|---|---|---|
| JP | 2012128489 A | 7/2012 |
| JP | 2019160116 A | 9/2019 |
| JP | 2021043891 A | 3/2021 |
| JP | 6886110 B2 | 5/2021 |

OTHER PUBLICATIONS

Chen, Elsa , "Using Drive Log for SSD Analysis", Phison Blog, Apr. 20, 2021, 13 pages.

* cited by examiner

STORAGE DEVICES CONFIGURED TO OBTAIN DATA OF EXTERNAL DEVICES FOR DEBUGGING

CROSS-REFERENCE TO RELATED APPLICATIONS

This application claims priority under 35 U.S.C. § 119 to Korean Patent Application Nos. 10-2021-0156074 filed on Nov. 12, 2021, and 10-2022-0057754 filed on May 11, 2022, in the Korean Intellectual Property Office, the disclosures of which are incorporated by reference herein in their entireties.

BACKGROUND

Embodiments of the present disclosure described herein relate to storage devices, and more particularly, relate to a technology for obtaining external data of a storage device connected with a host device through different types of buses.

A high-capacity storage device such as a solid state drive (SSD) is mainly connected with a host device, and a read operation or a write operation is performed on the SSD depending on a read request or a write request from the host device.

An error may occur in the storage device due to various causes. When the host device detects the error of the storage device, the host device may transfer a log dump request to the storage device. The storage device stores various data on the error of the storage device depending on the log dump request.

However, because only data on the error of the storage device are stored in the storage device in a log dump operation, only the data on the error of the storage device are used in the debugging of the storage device. In this case, it may not be possible to clearly find out the influence of the host device on the error of the storage device. Accordingly, to secure the reliability of the storage device, it may be important to clearly find out the influence of the host device on the error of the storage device.

SUMMARY

Embodiments of the present disclosure provide a method of obtaining data of an external device connected with a host device at a storage device connected with the host device through different types of buses.

The present disclosure may make it possible to find out the influence of the host device on an error of the storage device by together storing data of the external device obtained by the storage device in a log dump operation of the storage device.

According to an embodiment, a storage device comprises a nonvolatile memory device that comprises a first region storing user data and a second region not allocated to a user, and a storage controller that is configured to be connected with a host device through both a first-type bus and a second-type bus different from the first-type bus. The storage controller is configured to receive a first request and a second request from the host device through the first-type bus. The storage controller is configured to perform at least one operation on the nonvolatile memory device in response to the first request, and the storage controller is configured to store first data associated with the storage device in the second region in response to the second request. In response to the second request, the storage controller is further configured to access the second-type bus to obtain second data of at least one external device obtained by the host device and store the second data in the second region.

According to an embodiment, a storage device comprises a nonvolatile memory device that comprises a first region storing user data and a second region not allocated to a user, and a storage controller that is configured to be connected with a host device through both a first-type bus and a second-type bus different from the first-type bus. The storage controller is configured to receive a first request from the host device through the first-type bus. The storage controller is configured to perform at least one operation on the nonvolatile memory device in response to the first request. The storage controller is configured to execute a defense code for the storage device. In response to execution of the defense code, the storage controller is further configured to store first data of the storage device associated with the execution of the defense code in the second region. In response to the execution of the defense code, the storage controller is further configured to access the second-type bus to obtain second data of at least one external device obtained by the host device and store the second data in the second region.

According to an embodiment, a storage device comprises a nonvolatile memory device that comprises a first region storing user data and a second region not allocated to a user, a storage controller that is configured to be connected with a host device through both a first-type bus and a second-type bus different from the first-type bus and receive a first request from the host device through the first-type bus, and a plurality of pins that are configured to connect the storage device and the nonvolatile memory device. The storage controller is configured to perform at least one operation on the nonvolatile memory device in response to the first request. The nonvolatile memory device is configured to check a latency of signals received from the storage controller through at least some of the plurality of pins and transfer the check result to the storage controller. In response to the check result, the storage controller is configured to store first data of the storage device associated with the latency in the second region. In response to the check result, the storage controller is further configured to access the second-type bus to obtain second data of at least one external device obtained by the host device and store the second data in the second region.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the invention.

In the detailed description, components described with reference to the terms "unit", "module", "block", "~er or ~or", or the like, and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
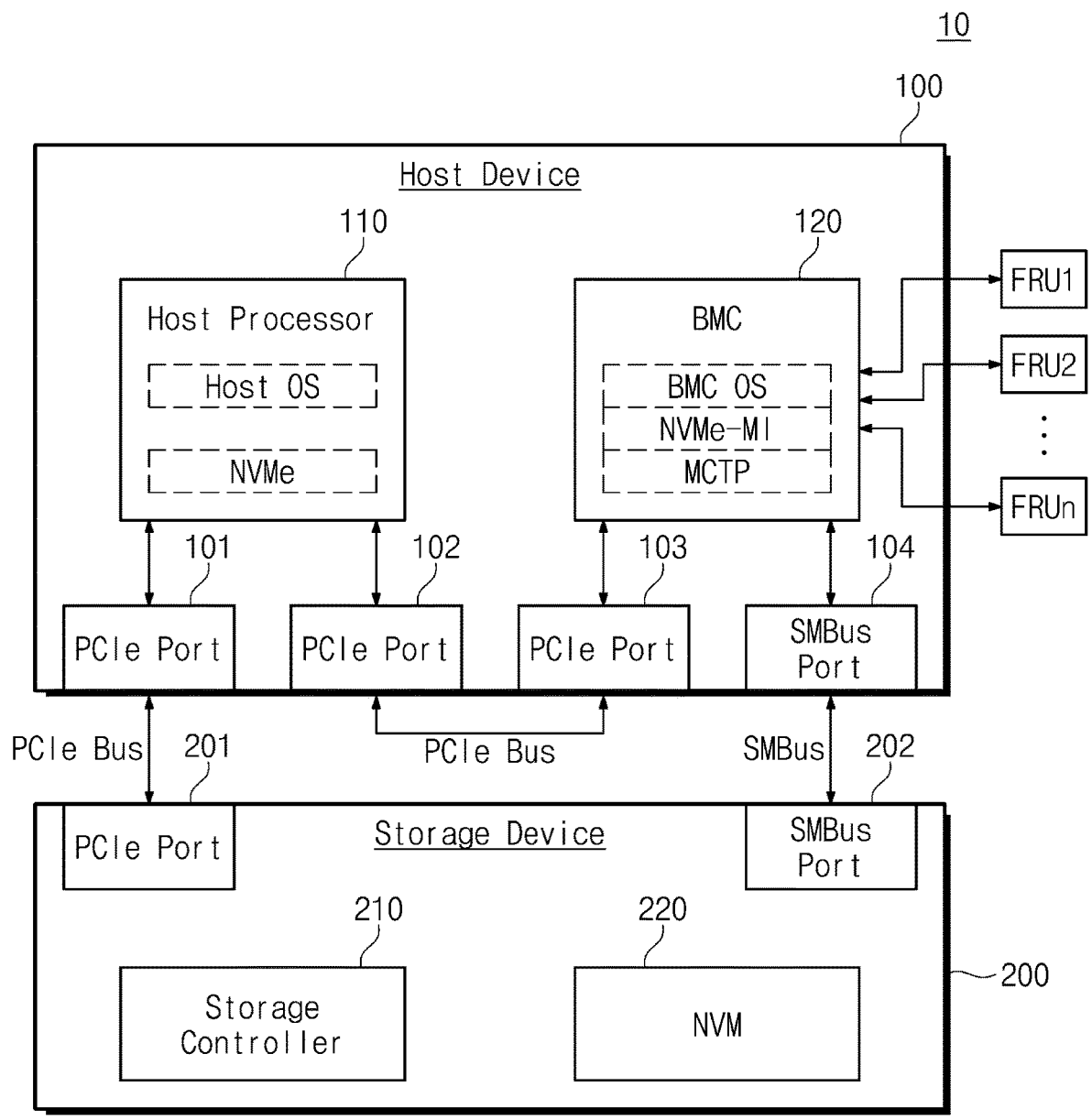
FIG. 1 is a block diagram illustrating a configuration of an electronic system according to an embodiment of the present disclosure.

FIG. 1 is a block diagram illustrating a configuration of an electronic system 10 according to an embodiment of the present disclosure.

The electronic system 10 may include a host device 100 and a storage device 200. For example, the electronic system 10 may be one of electronic devices such as a desktop computer, a laptop computer, a tablet, a smartphone, a wearable device, a video game console, a workstation, one or more servers, an electric vehicle, home appliances, and a medical device.

The host device 100 may include a host processor 110, a baseboard management controller (BMC) 120, peripheral component interconnect express (PCIe) ports 101, 102, and 103, and a system management bus (SMBus) port 104.

The host processor 110 may include an application layer such as a host operating system (OS), and a protocol layer such as non-volatile memory express (NVMe). The host OS may be driven by the host processor 110 and may control an overall operation of the host device 100. As the NVMe is driven by the host processor 110, the host device 100 may communicate with the storage device 200. The NVMe may be an interface of a register level, which regulates a method in which host software executed by the host device 100 communicates with the storage device 200 through a PCIe bus. The host processor 110 may be implemented with a general-purpose processor including one or more processor cores, a special-purpose processor, or an application processor.

The BMC 120 may include an application layer such as BMC OS, a protocol layer such as an NVMe management interface (NVMe-MI), and a transport layer such as a management component transport protocol (MCTP). The BMC OS may control an overall operation of the BMC 120. The NVMe-MI may provide one management console that supports an in-band management function, an out-of-band management function, and various OSs of the electronic system 10 operating based on the NVMe. The MCTP may define a message transfer protocol.

The BMC 120 may monitor states of sensors installed in respective hardware such as the host processor 110, a fan, and a power supplying device (e.g., a power supply). For example, the BMC 120 may collect data on physical states of field replaceable units (FRUs) of the host device 100 (or connected with the host device 100). Herein, the FRU may mean a component being removable/replaceable without the exchange or repair of the whole electronic system 10. For example, the FRUs may include a fan, various kinds of sensors, a power supplying device, and the like. In this case, the BMC 120 may collect data (hereinafter referred to as "FRU data") associated with a fan speed, a temperature of each component of the host device 100, a power supply voltage of a power supplying device. The BMC 120 and the FRUs may be connected with a system management bus (SMBus).

The BMC 120 may provide the FRU data to the host processor 110 through the PCIe port 103, a PCIe bus, and the PCIe port 102. The host processor 110 may provide the FRU data to the storage device 200 through the PCIe port 101, a PCIe bus, and a PCIe port 201. Additionally or alternatively, the BMC 120 may provide the FRU data to the SMBus connected with the storage device 200 in compliance with a given protocol.

Each of the PCIe ports 102 and 103 may include a physical layer and/or a logical layer configured to exchange and process data, signals, and/or packets such that the host processor 110 and the BMC 120 communicate with each other. Each of the PCIe ports 101 and 201 may include the same or similar layers allowing the host processor 110 and a storage controller 210 to communicate with each other, and each of the SMBus ports 104 and 202 may also include the same or similar layers allowing the BMC 120 and the storage controller 210 to communicate with each other. For example, herein, each of the PCIe ports 101, 102, 103, and and 201 and the SMBus ports 104 and 202 may include an NVMe management endpoint, and the NVMe management endpoint may be an MCTP endpoint.

Also, the BMC 120 may perform a system event log function. For example, when a value of data collected from a fan, a power supplying device, or the like is out of a threshold value, and/or when there is a power-on or power-off request of a power of the electronic system 10, the BMC 120 may store the events in a separate memory (not illustrated) in the host device 100.

Although not illustrated in drawings, the electronic system 10 may further include a working memory, a communication block, a user interface, or the like. In this case, the working memory may store data that are used in an operation of the electronic system 10. For example, the working memory may temporarily store data collected (or processed) by the BMC 120, as well as data processed (or to be processed) by the host processor 110. For example, the working memory may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (Re-RAM), or a ferroelectric RAM (FRAM).

The communication block may support at least one of various wireless or wired communication protocols for the purpose of communicating with an external device or system of the electronic system 10. The user interface may include various input/output interfaces for the purpose of arbitrating communication between the user and the electronic system 10.

The storage device 200 may include the storage controller 210 and a nonvolatile memory device 220. The storage device 200 of the present disclosure may obtain the FRU data through various paths. For example, the storage device 200 may receive the FRU data from the host processor 110 through the PCIe bus connected with the PCIe port 201. In an embodiment, the receiving of the FRU data may be performed depending on a request from the host processor 110. Additionally or alternatively, when an error occurs in the storage device 200, the storage device 200 may access the SMBus connecting the SMBus ports 104 and 202 and may obtain the FRU data from the SMBus. The storage device 200 may store both error information of the storage device 200 itself and the FRU information associated with the error of the storage device 200 in the nonvolatile memory device 220. As such, the fact that the error of the storage device 200 comes from an error of the host device 100 may be easily confirmed through the debugging.

Meanwhile, in the specification, the description is given as the BMC 120 and the FRUs are connected through the SMBus and the SMBus port 104 of the host device 100, and the SMBus port 202 of the storage device 200 is connected through the SMBus, but the present disclosure is not limited thereto. For example, in another embodiment, the storage device 200 and the host device 100 may be connected through an inter-integrated circuit (I2C) bus.

Figure 2:
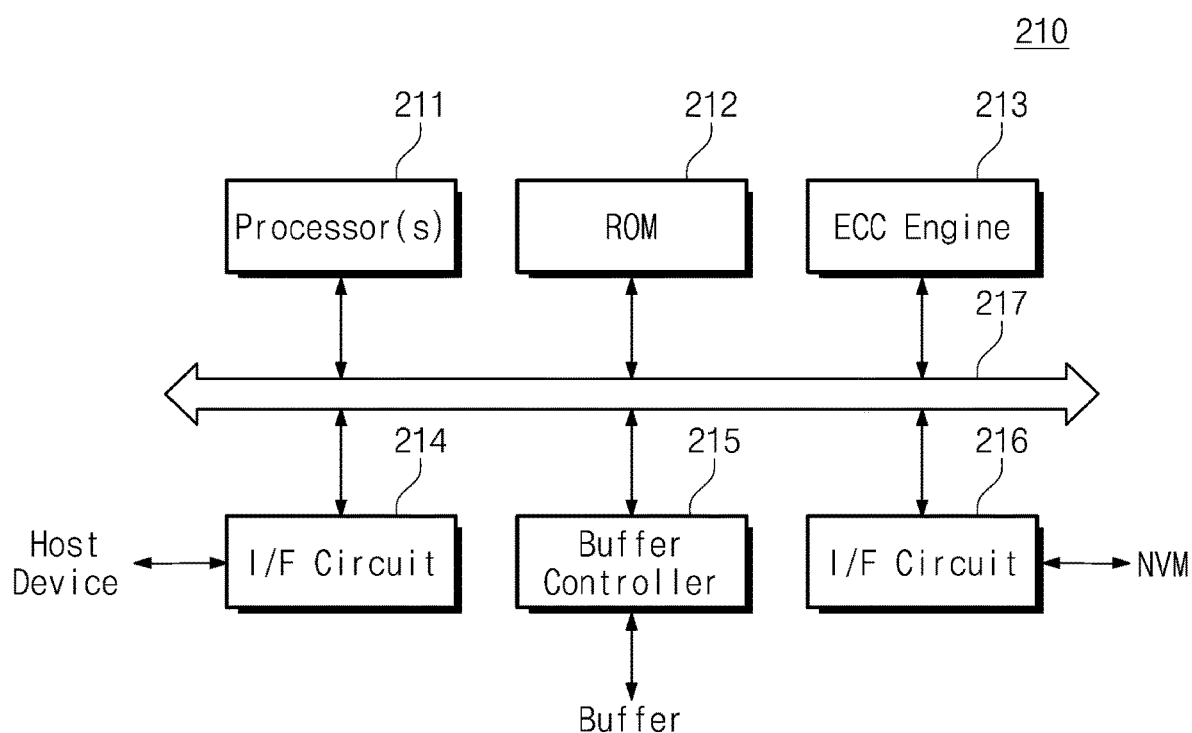
FIG. 2 illustrates a configuration of a storage controller illustrated in FIG. 1.

FIG. 2 illustrates a configuration of a storage controller illustrated in FIG. 1.

The storage controller 210 includes at least one processor 211, a ROM 212, an error check and correction (ECC) engine 213, a host interface circuit 214, a buffer controller 215, and a nonvolatile memory interface circuit 216.

The processor 211 may control an overall operation of the storage controller 210. The processor 211 may drive a variety of firmware or software necessary to control the nonvolatile memory device 220. For example, the processor 211 may drive a flash translation layer for managing a mapping table in which a relationship between logical addresses of the host device 100 and physical addresses of the nonvolatile memory device 220 is defined.

When the processor 211 receives a log dump request from the host device 100 (refer to FIG. 1) or when the storage device 200 (refer to FIG. 1) detects that an error occurs in the storage device 200, the processor 211 may generate a command (hereinafter referred to as a "log dump command") for writing an error-related event. The log dump command may be associated with storing the FRU data obtained from the SMBus connecting the storage device 200 and the host device 100, as well as the error of the storage device 200. The log dump command may be a vendor-specific command or a write command for storing the error-related event in the nonvolatile memory device 220.

The ROM 212 may be used as a read only memory that stores information necessary in the operation of the storage controller 210. For example, the ROM 212 may store a boot code necessary to boot up the storage device 200, separate firmware for loading firmware present in the nonvolatile memory device 220 (refer to FIG. 1) onto a buffer, and/or similar code and/or software or firmware. For example, the firmware stored in the ROM 212 may be executed upon booting up the storage device 200 or may be executed by a request of the host device (100 in FIG. 1) during the runtime of the storage device 200.

The ECC engine 213 may generate an error correction code for write data to be stored to the nonvolatile memory device 220. The ECC engine 213 may detect and correct an error of read data based on an error correction code read from the nonvolatile memory device 220. For example, the ECC engine 213 may have an error correction capability of a given level and may process data whose error level exceeds the error correction capability as uncorrectable data.

The host interface circuit 214 may communicate with the host device 100 by using a bus having various communication protocols. For example, a format of the bus may include at least one or more of various interface protocols such as peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), universal serial bus (USB), and small computer system interface (SCSI).

In an embodiment, the host interface circuit 214 is illustrated as a component of the storage controller 210, but it may be understood that the host interface circuit 214 includes at least some of functions of the PCIe port 201 (refer to FIG. 1) and/or the SMBus port 202 (refer to FIG. 1).

The buffer controller 215 may provide interfacing between the storage controller 210 and a buffer (e.g., a random access memory (RAM)). The buffer controller 215 may access the buffer depending on a request of the processor 211 or any other processor. For example, the buffer controller 215 may write data in the buffer depending on a write request of the processor 211. Alternatively, the buffer controller 215 may read data from the buffer depending on a read request of the processor 211.

The nonvolatile memory interface circuit 216 may communicate with the nonvolatile memory device 220.

Figure 3:
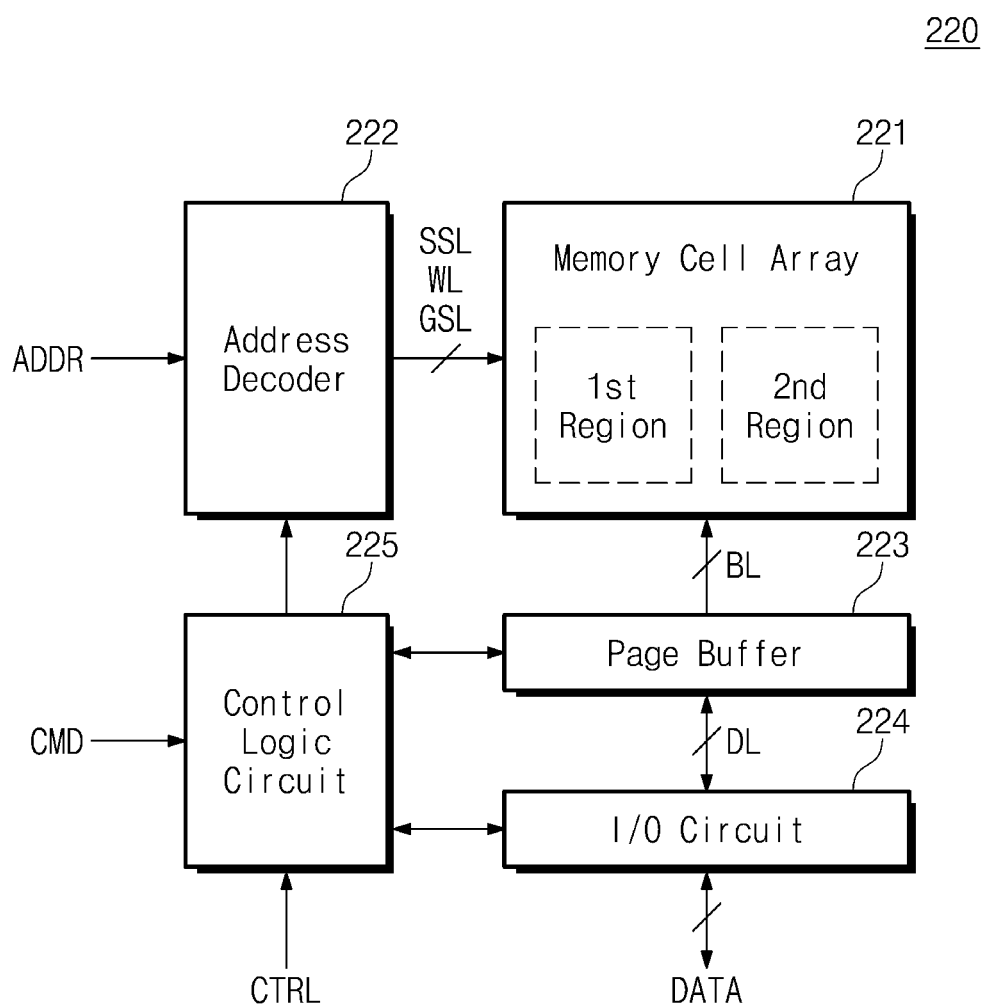
FIG. 3 illustrates a configuration of a nonvolatile memory device illustrated in FIG. 1.

FIG. 3 illustrates a configuration of a nonvolatile memory device illustrated in FIG. 1.

The nonvolatile memory device 220 may include a memory cell array 221, an address decoder 222, a page buffer 223, an input/output circuit 224, and a control logic circuit 225.

The memory cell array 221 may include a plurality of memory blocks. Each of the plurality of memory blocks may include a plurality of cell strings. Each of the cell strings includes a plurality of memory cells. The plurality of memory cells may be connected with a plurality of word lines WL. Each of the plurality of memory cells may include a single level cell (SLC) storing one bit or a multi-level cell (MLC) storing at least two bits.

The memory cell array 221 may be divided into a first region and a second region. The first region may be used to store user data, and the second region is a region not allocated to the user that may be used to manage the storage device 200 (refer to FIG. 1). For example, the second region may store firmware necessary for the storage device 200 to operate. In addition, the second region may store data (i.e., a log) associated with an error of the storage device 200 and/or the host device 100. For example, the second region may be referred to as a secure region or an overprovisioning (OP) region.

The address decoder 222 is connected with the memory cell array 221 through the plurality of word lines WL, string selection lines SSL, and ground selection lines GSL. The address decoder 222 may decode an address ADDR received from the outside and may drive the plurality of word lines WL based on a decoding result. For example, the address ADDR may be a physical address of the nonvolatile memory device 220, into which a logical address is translated. The above address translation operation may be performed by the flash translation layer (FTL) driven by the storage controller 210 (refer to FIG. 2).

The page buffer 223 is connected with the memory cell array 221 through a plurality of bit lines BL. Under control of the control logic circuit 225, the page buffer 223 may control the bit lines BL such that data "DATA" received from the input/output circuit 224 over data lines DL are stored in the memory cell array 221. Under control of the control logic circuit 225, the page buffer 223 may read data stored in the memory cell array 221 and may transfer the read data to the input/output circuit 224 over the data lines DL. In an embodiment, the page buffer 223 may receive data from the input/output circuit 224 in units of page or may read data from the memory cell array 221 in units of page.

The input/output circuit 224 may receive the data "DATA" from the external device and may provide the received data "DATA" to the page buffer 223.

The control logic circuit 225 may control the address decoder 222, the page buffer 223, and the input/output circuit 224 in response to a command CMD and a control logic CTRL received from the outside. For example, the control logic circuit 225 may control any other components in response to the signals CMD and CTRL such that the data "DATA" are stored in the memory cell array 221. Alternatively in response to the signals CMD and CTRL, the control logic circuit 225 may control any other components such that the data "DATA" stored in the memory cell array 221 are transferred to the external device. The control signal CTRL may be a signal that the storage controller 210 provides to control the nonvolatile memory device 220.

The control logic circuit 225 may generate various voltages necessary for the nonvolatile memory device 220 to operate. For example, the control logic circuit 225 may generate a plurality of program voltages, a plurality of pass voltages, a plurality of selection read voltages, a plurality of non-selection read voltages, a plurality of erase voltages, a plurality of verify voltages, and the like. The control logic circuit 225 may provide the generated voltages to the address decoder 222 or to a substrate of the memory cell array 221.

Figure 4:
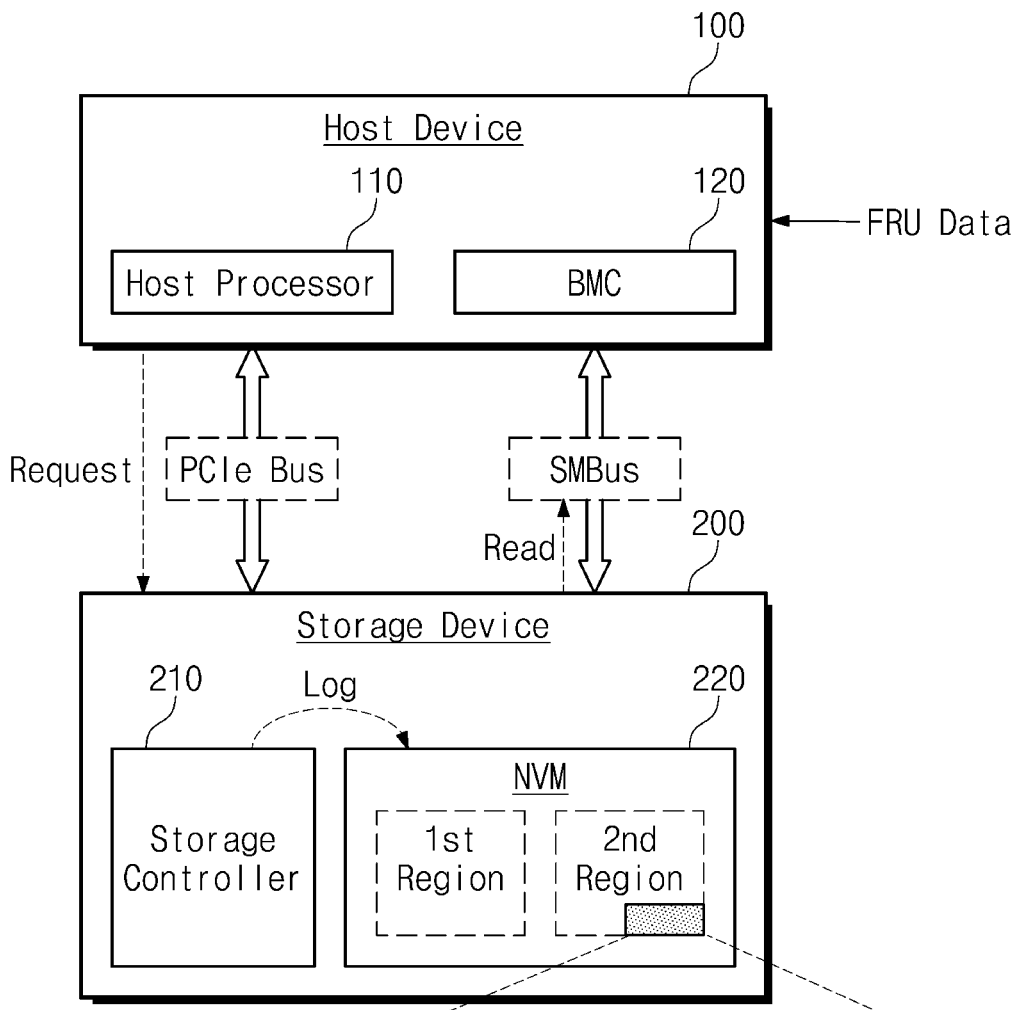
FIG. 4 illustrates an operation of an electronic system according to an embodiment of the present disclosure.

FIG. 4 illustrates an operation of the electronic system 10 according to an embodiment of the present disclosure.

The BMC 120 of the host device 100 may obtain the FRU data from FRUs. For example, the BMC 120 may obtain the FRU data from a fan radiating heat of the host device 100, a temperature sensor measuring an internal temperature of the host device 100, a power supplying device supplying a power of the host device 100, or other FRU devices. The FRU data may include information about a vendor, a type, and a state (i.e., a specific value) of an FRU device. For example, when the FRU is a fan, the FRU data obtained from the fan may include a vendor of the fan, a value indicating that the FRU is a fan, a speed RPM of the fan, and the like.

The BMC 120 may process the obtained FRU data such that information (i.e., a timestamp TS) about a generation time is added thereto. The BMC 120 may transfer the processed FRU data to the host processor 110 through a bus (e.g., a PCIe bus) in the host device 100. Additionally or alternatively, the BMC 120 may provide the processed FRU data to the SMBus connected with the storage device 200.

Additionally or alternatively, the BMC 120 may store the FRU data in a separate memory device in the host device 100.

In an embodiment, when it is determined that the performance of the storage device 200 is abnormal (or is reduced), the host device 100 may transfer a request (i.e., log dump) to the storage device 200. Herein, the request may be a request for storing information about an error of the storage device 200 (i.e., a device log) in the second region.

The storage device 200 may read data of the SMBus connected with the host device 100 in response to a request from the host device 100. In this case, the BMC 120 may allow the FRU data to flow through the SMBus in compliance with a given SMBus protocol, and the storage device 200 may obtain the FRU data from the SMBus connected with the host device 100. For example, the FRU data may include a type (i.e., a value indicating an FRU), an ID (i.e., a value indicating a kind of an FRU), a value capable of determining that the FRU is abnormal, a timestamp TS (i.e., a time when a value is generated), and the like.

The storage device 200 may generate the log dump command in response to a request from the host device 100. The log dump command may be associated with storing the FRU data (i.e., an FRU log) obtained from the SMBus and a device log associated with an error of the storage device 200 in the second region of the nonvolatile memory device 220. For example, the device log may include a type (i.e., a value indicating a storage device (e.g., an SSD)), an ID (i.e., a number of a storage device), a value capable of determining that a storage device is abnormal, a timestamp TS (i.e., a time when a value is generated).

The nonvolatile memory device 220 may store the FRU data and the device log in the second region of the nonvolatile memory device 220 in response to the log dump command.

In another embodiment, when it is determined that the FRU is abnormal, the host device 100 may transfer a request to the storage device 200. Herein, the request may mean a request for storing information (i.e., FRU data) associated with the error of the storage device 200 in the storage device 200.

The BMC 120 may determine that an FRU is abnormal based on whether FRU data obtained from the FRU are within a reference range, are smaller than a reference value, or exceed the reference value. Depending on a determination result, the BMC 120 may transfer, to the host processor 110, a signal indicating that the FRU is abnormal. Alternatively, unlike the case where the BMC 120 determines that the FRU is abnormal, the host processor 110 may determine that the FRU is abnormal based on whether FRU data received from the BMC 120 are within the reference range, are smaller than the reference value, or exceed the reference value.

When it is determined from the FRU data that the FRU is abnormal, the host processor 110 may transfer a request to the storage device 200. For example, the request of the host device 100 may include information indicating the storing of the FRU data in the storage device 200, as well as the log dump request. Accordingly, the request of the host device 100 may accompany the transfer of the FRU data to the storage device 200 through the PCIe bus.

The storage controller 210 may generate the log dump command in response to the request of the host device 100. The log dump command may include a command for storing the FRU data received through the PCIe bus and the device log in the second region of the nonvolatile memory device 220. The nonvolatile memory device 220 may store the FRU data and/or the device log in the second region of the nonvolatile memory device 220 in response to the log dump command.

In another embodiment, when it is determined that the FRU is abnormal, the host device 100 may transfer the request to the storage device 200. Herein, the request may include a request informing (or notifying) the host device 100 that there is an error. That is, the request may be a simple notification indicating that an error is present in the host device 100, and the storage device 200 may obtain the FRU data through a path different from a path (i.e., a PCIe bus) through which the request is received. For example, the storage device 200 may obtain the FRU data by reading data of the SMBus connected with the host device 100 in response to the request from the host device 100.

The storage device 200 may generate the log dump command in response to the request from the host device 100. The log dump command may be associated with storing the FRU data (i.e., an FRU log) obtained from the SMBus and a device log associated with an error of the storage device 200 in the second region of the nonvolatile memory device 220.

Figure 5:
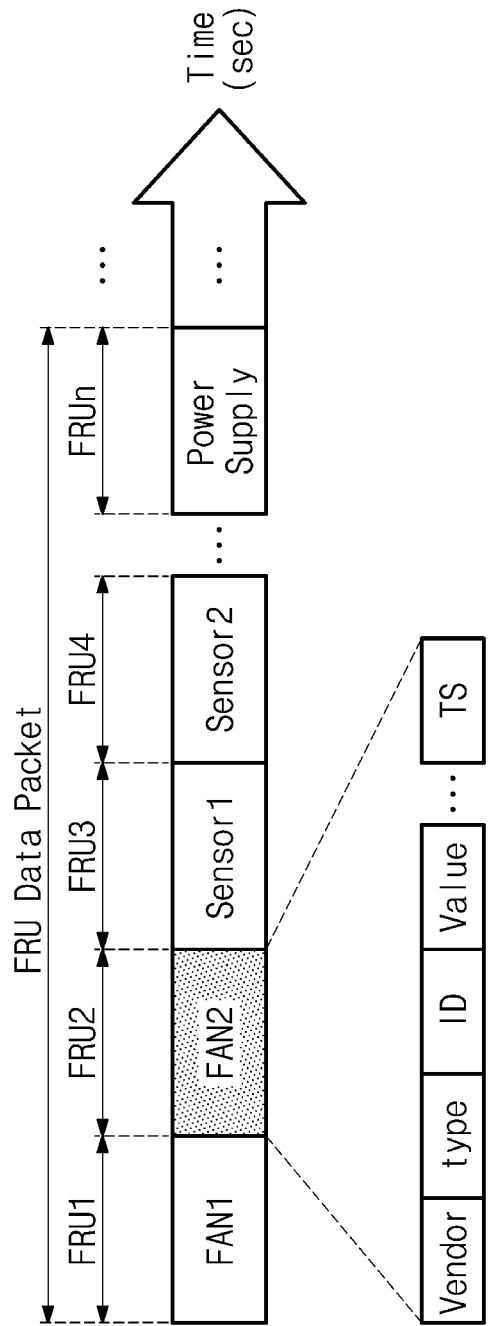
FIG. 5 illustrates an example of a format of data flowing through a system management bus (SMBus) connecting a host device and a storage device of FIG. 4.

FIG. 5 illustrates an example of a format of data flowing through the SMBus connecting the host device 100 and the storage device 200 of FIG. 4.

In compliance with a given protocol, the BMC 120 (refer to FIG. 4) may allow the FRU data to flow through the SMBus or may provide the FRU data to the host processor 110 (refer to FIG. 4). For example, the BMC 120 may collect the FRU data at a specific time and may provide the collected FRU data in the form of a packet. For example, an FRU data packet may include both the FRU data obtained from each FRU and information (i.e., a timestamp TS) about a time at which each piece of the FRU data is obtained.

The order of the FRU data constituting the FRU data packet and the size of each piece of FRU data may be determined in advance. An embodiment in which the FRU data packet is arranged (or transferred) in the order of IDs for distinguishing FRUs (i.e., the order from FRU1 to FRUn) is illustrated.

In addition, the order of arranging items (e.g., a vendor, a type, an ID, and a value) constituting each FRU and the size of data of each item may be determined in advance. As a result, the storage controller 210 may obtain FRU information (e.g., a fan speed and a temperature) at a specific time by reading the FRU data flowing through the SMBus connected with the BMC 120.

Afterwards, the BMC 120 may obtain FRU data at another time and may process the obtained FRU data such that information (i.e., a timestamp TS) about a generation time is added thereto; afterwards, the BMC 120 may allow the processed data to flow through the SMBus or may provide the processed data to the host processor 110. For example, a period at which the FRU data packet is transferred may be equal to or less than a period at which the BMC 120 obtains FRU data from FRUs, but the present disclosure is not limited thereto.

Figure 6:
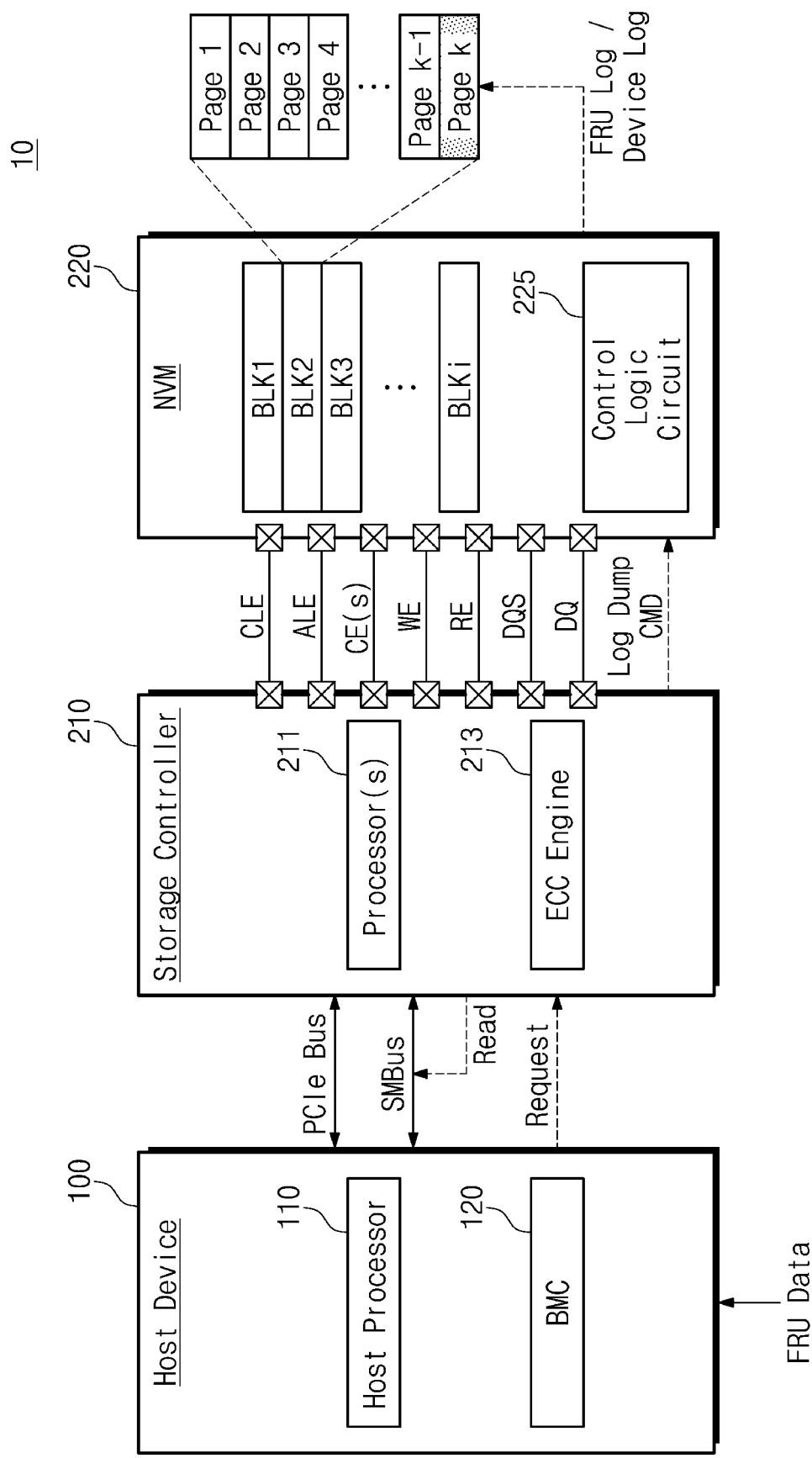
FIG. 6 illustrates an operation of an electronic system according to an embodiment of the present disclosure.

FIG. 6 illustrates an operation of the electronic system 10 according to an embodiment of the present disclosure.

The electronic system 10 may include the host device 100 and the storage device 200, and the storage device 200 may include the storage controller 210 and the nonvolatile memory device 220. The storage controller 210 and the nonvolatile memory device 220 may each include a plurality of pins for exchanging signals with each other.

The storage controller 210 may transfer the log dump command, the FRU data, and the device log to the nonvolatile memory device 220 depending on a request from the host device 100. To transfer the log dump command, the FRU data, and the device log to the nonvolatile memory device 220, the storage controller 210 may use at least some of a command latch enable signal CLE, an address latch enable signal ALE, one or more chip enable signals CE(s), a write enable signal WE, a read enable signal RE, a data strobe signal DQS, and a data signal DQ. For example, the log dump command (Log Dump CMD) may be a normal write command or a vendor-specific command.

The nonvolatile memory device 220 may be implemented to store the FRU data (i.e., FRU log) and/or information (i.e., a device log) about an error of the storage device 200 in response to the log dump command. For example, the nonvolatile memory device 220 may store the FRU data in a specific region (e.g., page k) of the nonvolatile memory device 220 depending on an address and a write command based on at least some of the above signals. Herein, a memory block BLK2 may be a region that is not allocated to the user.

The nonvolatile memory device 220 may include the control logic circuit 225 and a plurality of memory blocks BLK1 to BLKi. Each of the plurality of memory blocks BLK1 to BLKi may include a plurality of pages Page 1 to Page k (k being an integer of 2 or more). Each of the plurality of pages Page 1 to Page k may include a plurality of memory cells. Each of the plurality of memory cells may be a memory cell (i.e., a single level cell (SLC)) storing one bit or a memory cell (i.e., a multi-bit cell such as a multi-level cell (MLC) or a triple level cell (TLC)) storing a plurality of bits.

The nonvolatile memory device 220 may be implemented to store data. The nonvolatile memory device 220 may be implemented in a three-dimensional array structure). For example, the nonvolatile memory device 220 may be implemented with a vertical NAND flash memory device (VNAND). The nonvolatile memory device 220 may include a charge trap flash (CTF) memory in which a charge storage layer is formed of an insulating layer, as well as a flash memory in which a charge storage layer is formed of a conductive floating gate However, the nonvolatile memory device 220 is not limited thereto. For example, the nonvolatile memory device 220 may include a NAND flash memory), a NOR flash memory, a resistive random access memory (RRAM), a phase-change memory (PRAM), a magneto-resistive random access memory (MRAM), a ferroelectric random access memory (FRAM), a spin transfer torque random access memory (STT-RAM), and the like.

Figure 7:
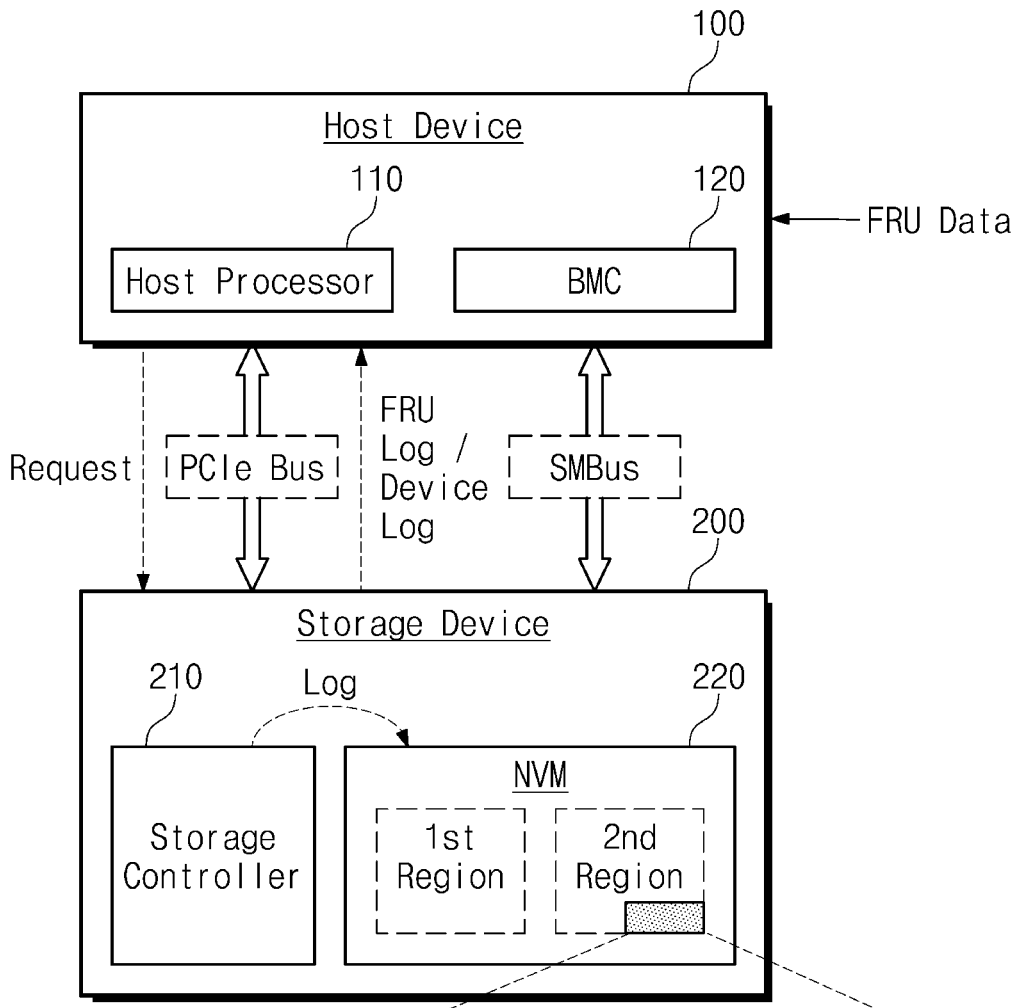
FIG. 7 illustrates an operation of an electronic system according to an embodiment of the present disclosure.

FIG. 7 illustrates an operation of the electronic system 10 according to an embodiment of the present disclosure.

To debug an error of the storage device 200, the host device 100 may transfer a request for reading the FRU data and/or the device log to the storage device 200. The request of the host device 100 may be transferred through the PCIe bus.

In response to the request from the host device 100, the storage controller 210 may generate a command and an address for the purpose of reading data of a specific region, in which the FRU data and/or the device log is stored, from among the second region of the nonvolatile memory device 220. Herein, the command may be a vendor-specific command or a read command. The control logic circuit 225 (refer to FIG. 6) of the nonvolatile memory device 220 may read the FRU data and/or the device log by accessing the specific region, in which the FRU data and/or the device log is stored, in response to the command and the address received from the storage controller 210. The storage controller 210 may transfer the read FRU data and/or the read device log to the host device 100 through the PCIe bus.

In general, because only the device log is used in the debugging of the storage device 200, it may be difficult to find out the influence of the error of the host device 100 on the error of the storage device 200. However, according to the present disclosure, because the debugging is performed by using both the device log and the FRU data, the influence of the host device 100 on the error of the storage device 200 may be found out, and thus, it may be possible to clearly clarify the matter of responsibility of the error of the storage device 200.

Figure 8:
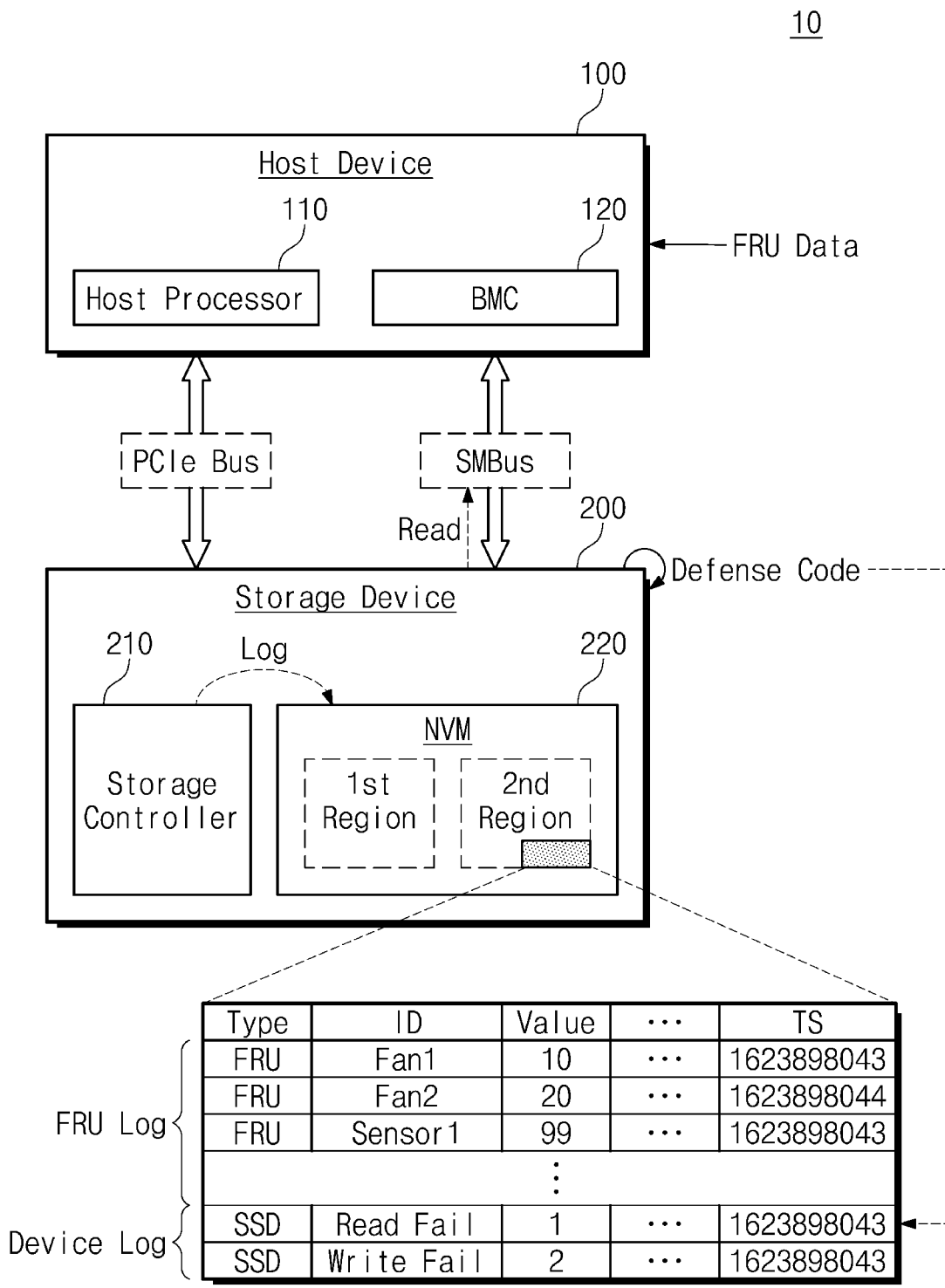
FIG. 8 illustrates an operation of an electronic system according to an embodiment of the present disclosure.

FIG. 8 illustrates an operation of the electronic system 10 according to an embodiment of the present disclosure.

While the host device 100 and the storage device 200 communicate with each other, the storage device 200 may perform various operations, such as a read operation, a write operation, and an erase operation, depending on a request from the host device 100. When an error occurs in the storage device 200, the storage device 200 may execute a defense code for revising the error. The defense code may refer to a software recovery algorithm in a narrow sense and may refer to the ECC engine 213 (refer to FIG. 2) in the storage controller 210 in a broad sense.

The defense code may include a prevention technology and a recovery technology. For example, the prevention technology is a technology for proactively preventing the degradation of the nonvolatile memory device 220 that includes garbage collection for managing an invalid block, wear leveling for uniform degradation of memory blocks, read reclaims for blocking a fault in advance by predicting a degradation level, copying data of a block having the predicted degradation level into any other block, and the like. The recovery defense code may include all technologies that decrease an error such that the error is corrected or allow the ECC engine 213 (refer to FIG. 2) to correct the error, when the ECC engine 213 fails in error correction. For example, the recovery defense code may include decreasing the number of errors by shifting a read level to an optimum level when the number of errors increases due to an inaccurate read level.

When one of the above defense codes is executed, the storage device 200 of the present disclosure may read data flowing through the SMBus connected with the host device 100. This is based on the fact that an error of the host device 100 affects the execution of the defense code of the storage device 200. The storage controller 210 may temporarily store the read FRU data in the buffer (e.g., 215 of FIG. 2), and may generate the log dump command for storing the FRU data and/or the device log associated with the error of the storage device 200 in the nonvolatile memory device 220. The nonvolatile memory device 220 may store the FRU data and/or the device log in the second region of the nonvolatile memory device 220 based on the log dump command.

Figure 9:
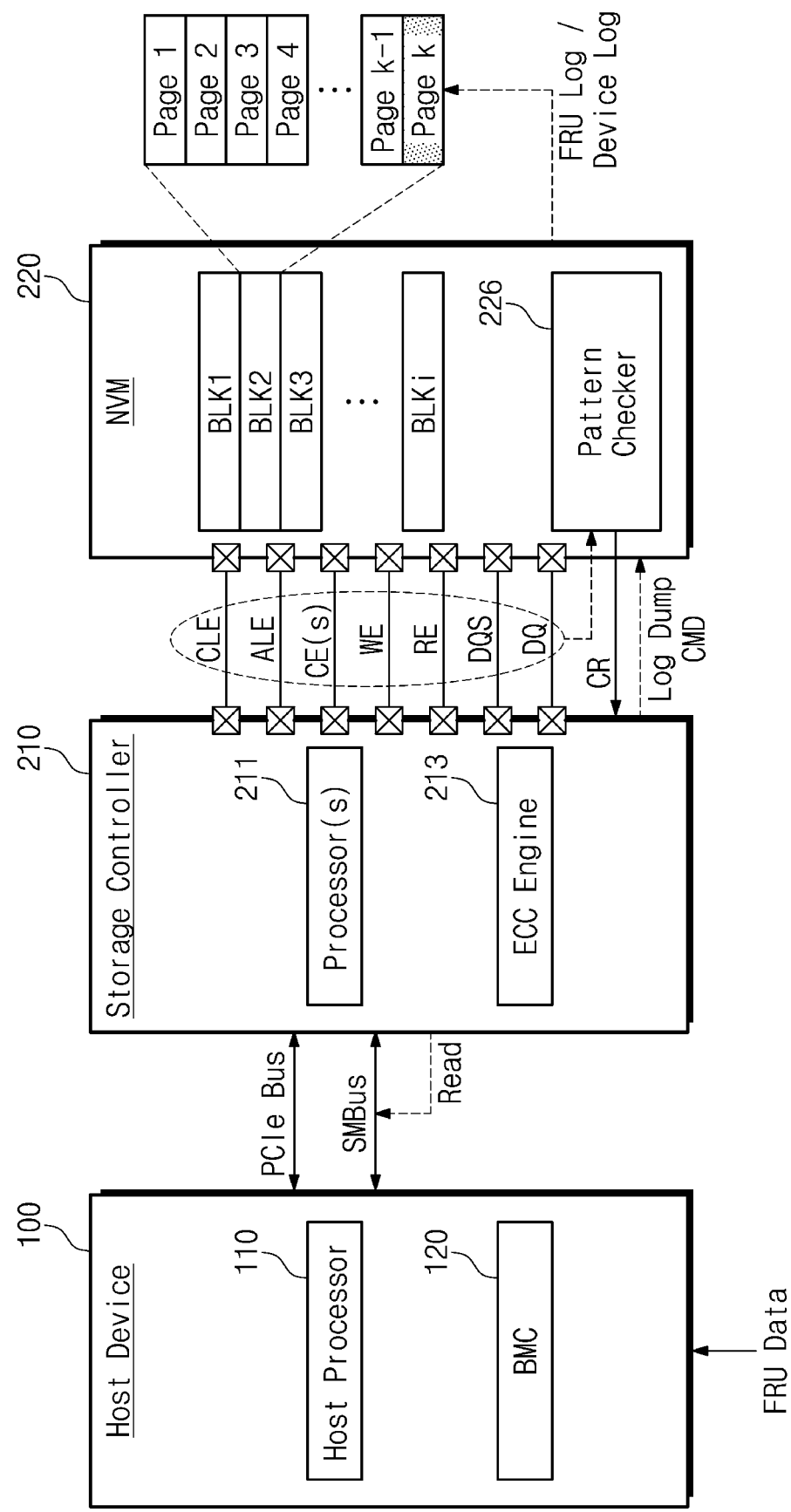
FIG. 9 illustrates an operation of an electronic system according to an embodiment of the present disclosure.

FIG. 9 illustrates an operation of the electronic system 10 according to an embodiment of the present disclosure.

To perform a read operation, a write operation, and a maintenance operation of the nonvolatile memory device 220 while the storage device 200 operates, the storage controller 210 may exchange the following signals with the nonvolatile memory device 220: the command latch enable signal CLE, the address latch enable signal ALE, and one or more chip enable signals CE(s). The above signals that are exchanged between the storage controller 210 and the nonvolatile memory device 220 may have the timing and the latency according to a given rule. However, when the above signals (or signals illustrated in FIG. 9) do not have the given latency, an error may occur in the storage device 200. The error may be correctable through the defense code described with reference to FIG. 8, but an error that is not corrected may make the electronic system 10 operate erroneously.

In addition, because there is the probability that the delayed latency of the signals between the storage controller 210 and the nonvolatile memory device 220 comes from errors of FRUs (e.g., a fan speed being out of a reference range, a temperature being out of a reference range, and a system power being out of a reference range), there is a need to write the FRU data together in the log dump of the storage device 200.

Accordingly, the nonvolatile memory device 220 may include a pattern checker 226 for checking a pattern of signals CLE, ALE, CE, WE, RE, DQS, and DQ received from the storage controller 210. When a check result CR of the pattern checker 226 indicates that the pattern (i.e., a latency) of the storage controller 210 is out of an allowable range (i.e., an allowable error range), the pattern checker 226 may transfer the check result CR to the storage controller 210. The storage controller 210 may read the FRU data flowing through the SMBus connected with the host device 100 in response to the check result CR. In addition, the storage controller 210 may generate the log dump command in response to the check result CR. The FRU data and the device log may be stored in a specific region (e.g., Page k) of the nonvolatile memory device 220 depending on the log dump command. Herein, the device log may include information about the error of the storage device 200 due to the pattern being out of the allowable range, and a page Page k of the memory block BLK2 may be a region that is not allocated to the user.

In another embodiment, the storage controller 210 may further include a pattern checker similar to the pattern checker 226 of the nonvolatile memory device 220. In this case, the pattern checker of the storage controller 210 may be used to check the pattern of the data signal DQ and/or the data strobe signal DQS received from the nonvolatile memory device 220.

Afterwards, when there is a need to debug the error of the storage device 200, the host device 100 may request the storage device 200 to read the FRU data and/or the device log, and the storage controller 210 may transfer the FRU data and/or the device log stored in the page Page k to the storage device 200.

Figure 10:
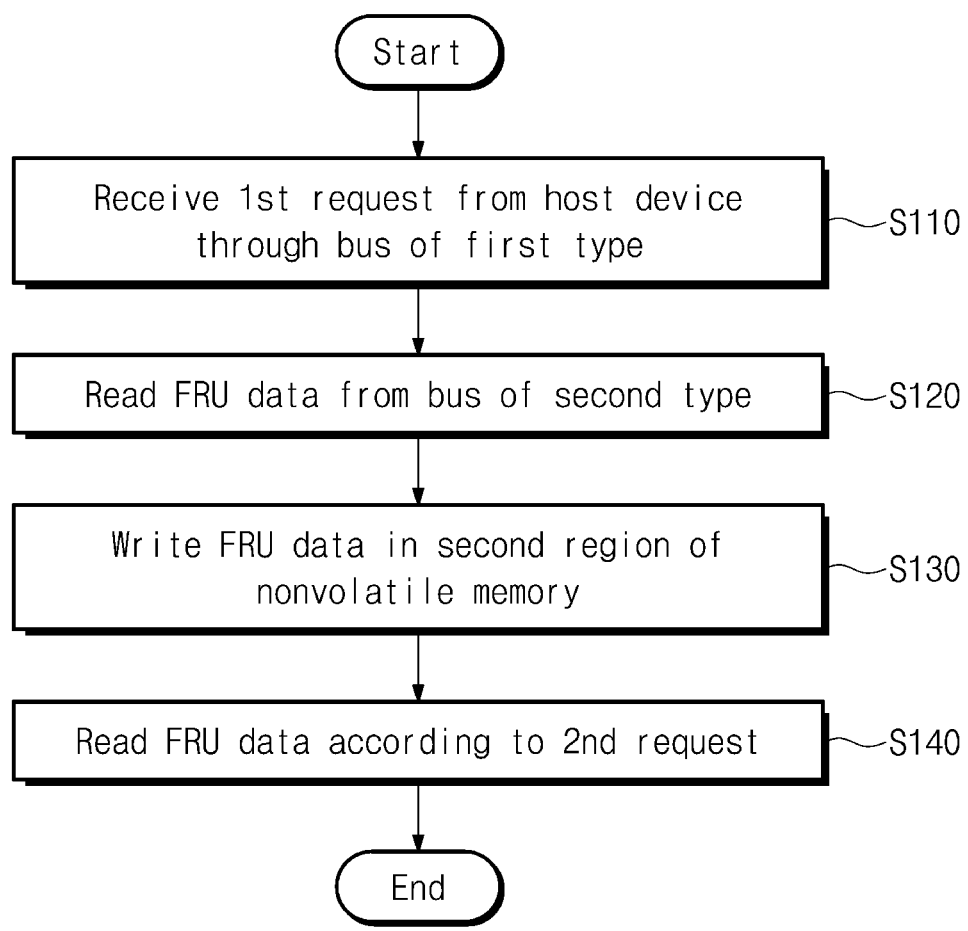
FIG. 10 illustrates an operating method of a storage device according to an embodiment of the present disclosure.

FIG. 10 illustrates a method of operating a storage device according to an embodiment of the present disclosure.

Referring to FIGS. 4, 7, and 10, the storage device 200 may receive a first request from the host device 100 (S110). Herein, the first request may be a request (i.e., a log dump request) for storing information (i.e., a device log) about an error of the storage device 200 in the nonvolatile memory device 220. The first request may be received through a bus of a first type (i.e., PCIe).

The storage device 200 may read the FRU data from a bus of a second type, which is connected with the host device 100, in response to the request of the host device 100 (S120). For example, the bus of the second type may be an SMBus. The storage controller 210 may generate the log dump command for storing the FRU data and optionally the device log in the nonvolatile memory device 220. The storage controller 210 may write the FRU data and the device log in the second region of the nonvolatile memory device 220 based on the log dump command (S130).

Afterwards, when the debugging by the host device 100 is required, the storage device 200 may receive a second request from the host device 100 through the first-type bus and may read the FRU data depending on the second request (S140). The read FRU data may be transferred to the host device 100 through the first-type bus.

Figure 11:
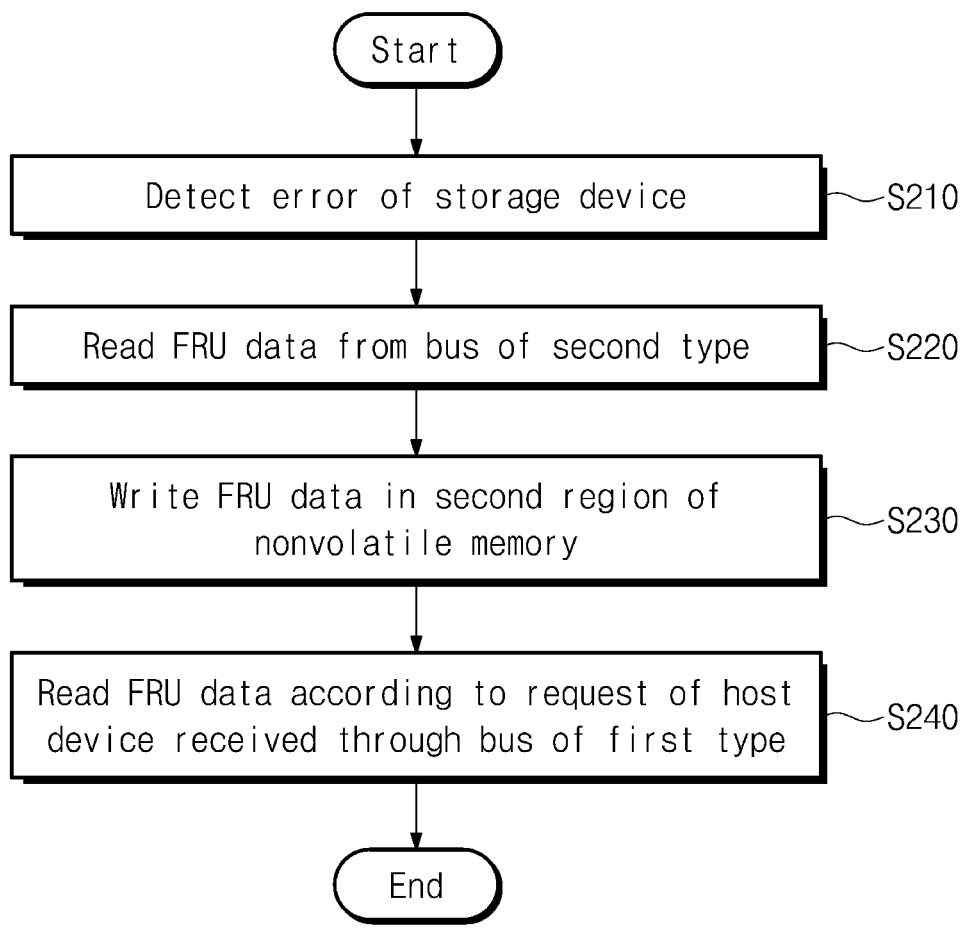
FIG. 11 illustrates an operating method of a storage device according to an embodiment of the present disclosure.

FIG. 11 illustrates a method of operating a storage device according to an embodiment of the present disclosure.

Referring to FIGS. 4, 7, and 11, the storage device 200 may detect an error of the storage device 200 (S210). For example, the error detection may be based on the execution of the defense code by the storage device 200 and may correspond to one of the read reclaim and the error correction by the ECC engine described in the above embodiments.

The storage device 200 may read the FRU data from a bus of a second type, which is connected with the host device 100, in response to the error detection of the storage device 200 (S220). For example, the bus of the second type may be an SMBus.

The storage controller 210 may generate the log dump command for storing the FRU data and/or the device log in the nonvolatile memory device 220 and may write the FRU data and/or the device log in the second region of the nonvolatile memory device 220 (S230).

Afterwards, the storage device 200 may receive a request from the host device 100 through the first-type bus and may read the FRU data depending on the request (S240). The read FRU data may be transferred to the host device 100 through the first-type bus.

Figure 12:
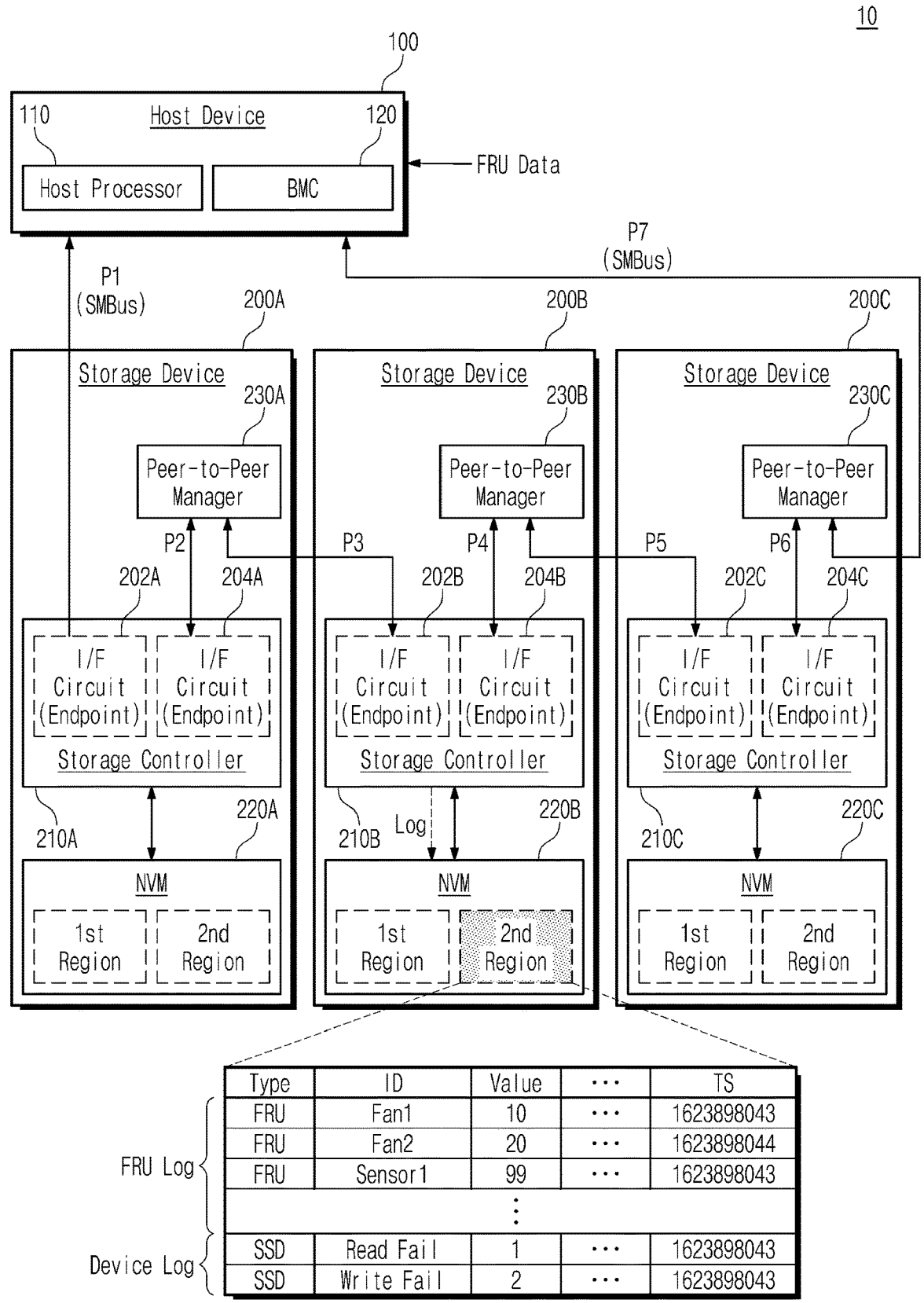
FIG. 12 illustrates an operation of an electronic system according to an embodiment of the present disclosure.

FIG. 12 illustrates an operation of the electronic system 10 according to an embodiment of the present disclosure.

The storage device may include storage devices 200A, 200B, and 200C connected with the host device 100, and the storage devices 200A and 200C may be directly connected with the host device 100. Each of the storage devices 200A, 200B, and 200C may be implemented with a dual-port structure for peer-to-peer communication.

The storage device 200A may include a storage controller 210A, a nonvolatile memory device 220A, and a peer-to-peer manager 230A. The storage controller 210A may include interface circuits 202A and 204A. Each of the interface circuits 202A and 204A may include a physical layer and/or a logical layer configured to exchange and process data, signals, and/or packets to allow the storage controller 210A to communicate with a component present in the outside of the storage controller 210A. Each of the interface circuits 202A and 204A may include a hardware circuit configured to process communication between the storage controller 210A and an external component.

The interface circuit 202A may be connected with a second port of the storage device 200A. The second port of the storage device 200A may provide a data path P1 (e.g., an SMBus) between the storage controller 210A and the host processor 110. The storage device 200A may communicate with the BMC 120 through the interface circuit 202A, the data path P1, and the second port.

The interface circuit 204A may be connected with the peer-to-peer manager 230A. A data path P2 (e.g., an SMBus) may be provided between the storage controller 210A and the peer-to-peer manager 230A. The storage controller 210A may communicate with the peer-to-peer manager 230A through the interface circuit 204A and the data path P2.

The peer-to-peer manager 230A may be connected with a first port of the storage device 200A. The peer-to-peer manager 230A may be placed between the first port and the storage controller 210A. The storage controller 210A may be placed between the first port of the storage device 200A and the second port of the storage device 200A.

The storage device 200A may be connected with any other device (e.g., the storage device 200B) present in the outside of the storage device 200A through the first port. The first port of the storage device 200A may provide a data path P3 (e.g., an SMBus) between the peer-to-peer manager 230A and the storage device 200B. The storage device 200A may communicate with the storage device 200B through the data path P3 and the first port.

The peer-to-peer manager 230A may include an internal switch and an operation logic circuit, although not illustrated. Depending on operations of the internal switch and/or the operation logic circuit of the peer-to-peer manager 230A, the peer-to-peer manager 230A may provide the paths P2 and P3 for transferring data between the storage controller 210A and the storage device 200B in the peer-to-peer manner. The internal switch of the peer-to-peer manager 230A may manage the flow of data that are output or received to or from the storage device 200A through the first port. The internal switch of the peer-to-peer manager 230A may be implemented with hardware (e.g., a switch, a root complex, or a combination thereof) for managing the flow of data.

The storage device 200B may include a storage controller 210B, a nonvolatile memory device 220B, and a peer-to-peer manager 230B. The storage controller 210B may include interface circuits 202B and 204B. The peer-to-peer manager 230B may include an internal switch and an operation logic circuit.

The peer-to-peer manager 230B may be connected with the storage device 200C through the first port of the storage device 200B and a data path P5 (e.g., an SMBus). The interface circuit 202B may be connected with the storage device 200A through the second port of the storage device 200B and the data path P3. The interface circuit 204B may be connected with the peer-to-peer manager 230B through a data path P4.

Configurations and operations of the nonvolatile memory device 220B, and the interface circuits 202B and 204B of the storage device 200B may be substantially the same as or similar to those of the nonvolatile memory device 220A, and the interface circuits 202A and 204A of the storage device 200A, and thus, additional description will be omitted to avoid redundancy.

The storage device 200C may include a storage controller 210C, a nonvolatile memory device 220C, and a peer-to-peer manager 230C. The storage controller 210C may include interface circuits 202C and 204C. The peer-to-peer manager 230C may include an internal switch and an operation logic circuit.

The peer-to-peer manager 230C may be connected with the BMC 120 through the first port of the storage device 200C and a data path P7 (e.g., an SMBus). The interface circuit 202C may be connected with the storage device 200B through the second port of the storage device 200C and the data path P5. The interface circuit 204C may be connected with the peer-to-peer manager 230C through a data path P6.

Configurations and operations of the nonvolatile memory device 220C, and the interface circuits 202C and 204C of the storage device 200C may be substantially the same as or similar to those of the nonvolatile memory device 220A, and the interface circuits 202A and 204A of the storage device 200A, and thus, additional description will be omitted to avoid redundancy.

Meanwhile, for brevity of drawing, a PCIe bus connecting the host device 100 and the storage devices 200A and 200C, a PCIe bus connecting the storage devices 200A and 200B, and a PCIe bus connecting the storage devices 200B and 200C are not illustrated. However, the connection by the PCIe bus may be made to be similar to the above manner through the peer-to-peer managers 230A, 230B, and 230C.

In an embodiment, when it is determined that the performance of the storage device 200B is abnormal (or is reduced), the host device 100 may transfer a request to the storage device 200B. Herein, the request may be a request for storing information about an error (i.e., a device log) of the storage device 200B in the second region of the nonvolatile memory device 220B.

In detail, the request received from the host device 100 may be transferred to the storage controller 210B through the data paths by the PCIe buses. The storage controller 210B may read the FRU data flowing through the data path P1 in response to the request from the host device 100. The storage controller 210B may store the FRU data and the device log about the error of the storage controller 210B in the second region of the nonvolatile memory device 220B in response to the request from the host device 100.

In an embodiment, the host device 100 may transfer the FRU data to the storage device 200B through the PCIe bus, not the SMBus. However, the data transfer in the dual-port storage device according to the above manner is similar to that described with reference to FIG. 4, and thus, additional description will be omitted to avoid redundancy.

Figure 13:
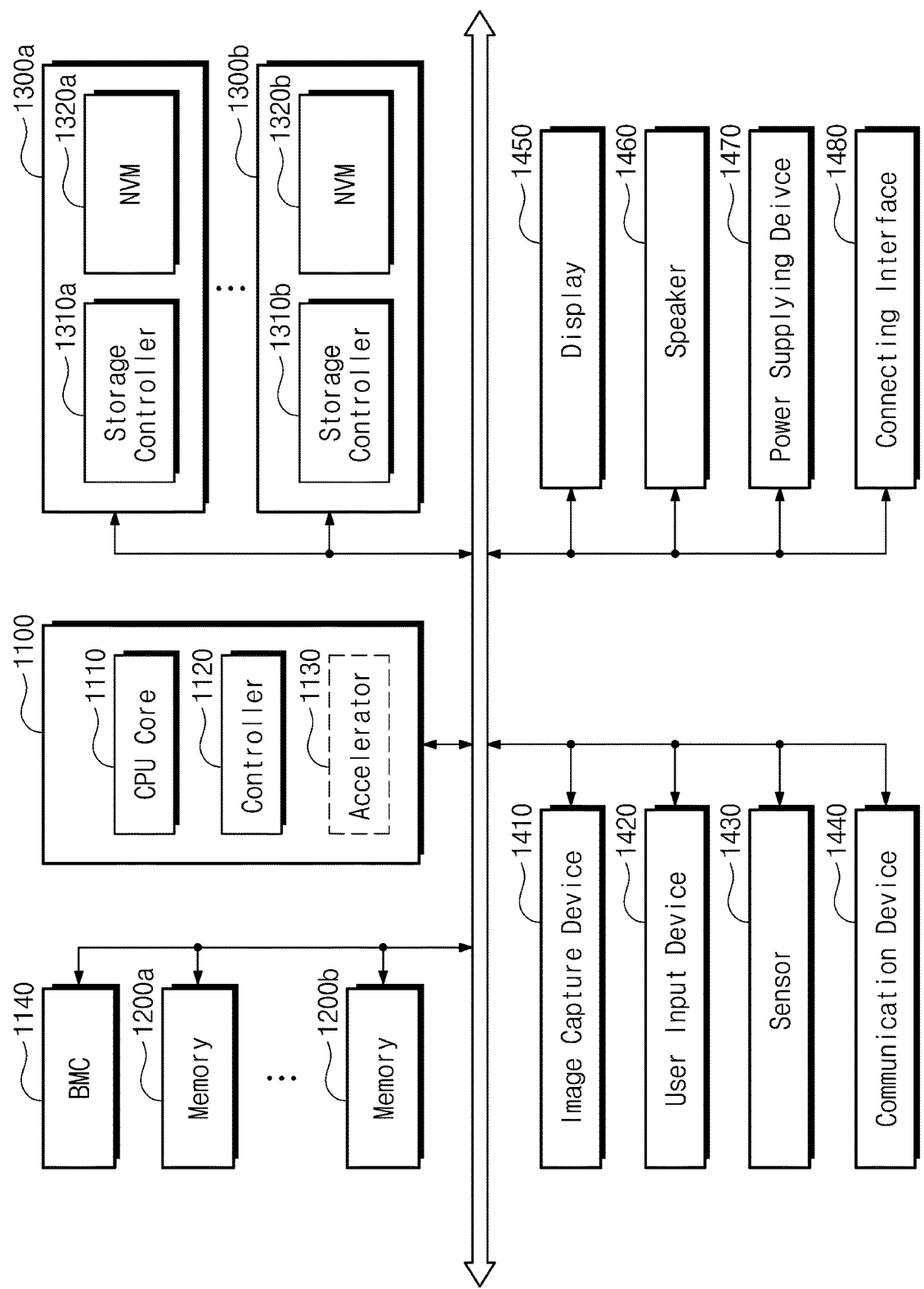
FIG. 13 is a diagram illustrating a system to which a storage device according to an embodiment of the present disclosure is applied.

FIG. 13 is a diagram illustrating a system to which a storage device according to an embodiment of the present disclosure is applied.

A system 1000 may include a main processor 1100, a BMC 1140, memories 1200*a* and 1200*b*, and storage devices 1300*a* and 1300*b*, and may further include one or more of an image capture device 1410, a user input device 1420, a sensor 1430, a communication device 1440, a display 1450, a speaker 1460, a power supplying device 1470, and a connecting interface 1480.

The main processor 1100 may control all operations of the system 1000, and more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU), and may be implemented as a chip that is physically separate from the other components of the main processor 1100.

The BMC 1140 may collect the FRU data from an FRU such as the sensor 1430 or the power supplying device 1470. The BMC 1140 may communicate with the main processor 1100 through the first-type bus and may communicate with the storage devices 1300*a* and 1300*b* through the second-type bus. The BMC 1140 may provide the collected FRU data to the main processor 1100 through the first-type bus or may provide the collected FRU data to the second-type bus.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may also include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers 1310*a* and 1310*b* and Non-Volatile Memories (NVMs) 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

In an embodiment, the storage device 1300*a*, 1300*b* may be a storage device as depicted in FIG. 1 through FIG. 12. The storage device 1300*a*, 1300*b* may operate based on as described with reference to FIG. 1 through FIG. 12.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer system interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 14:
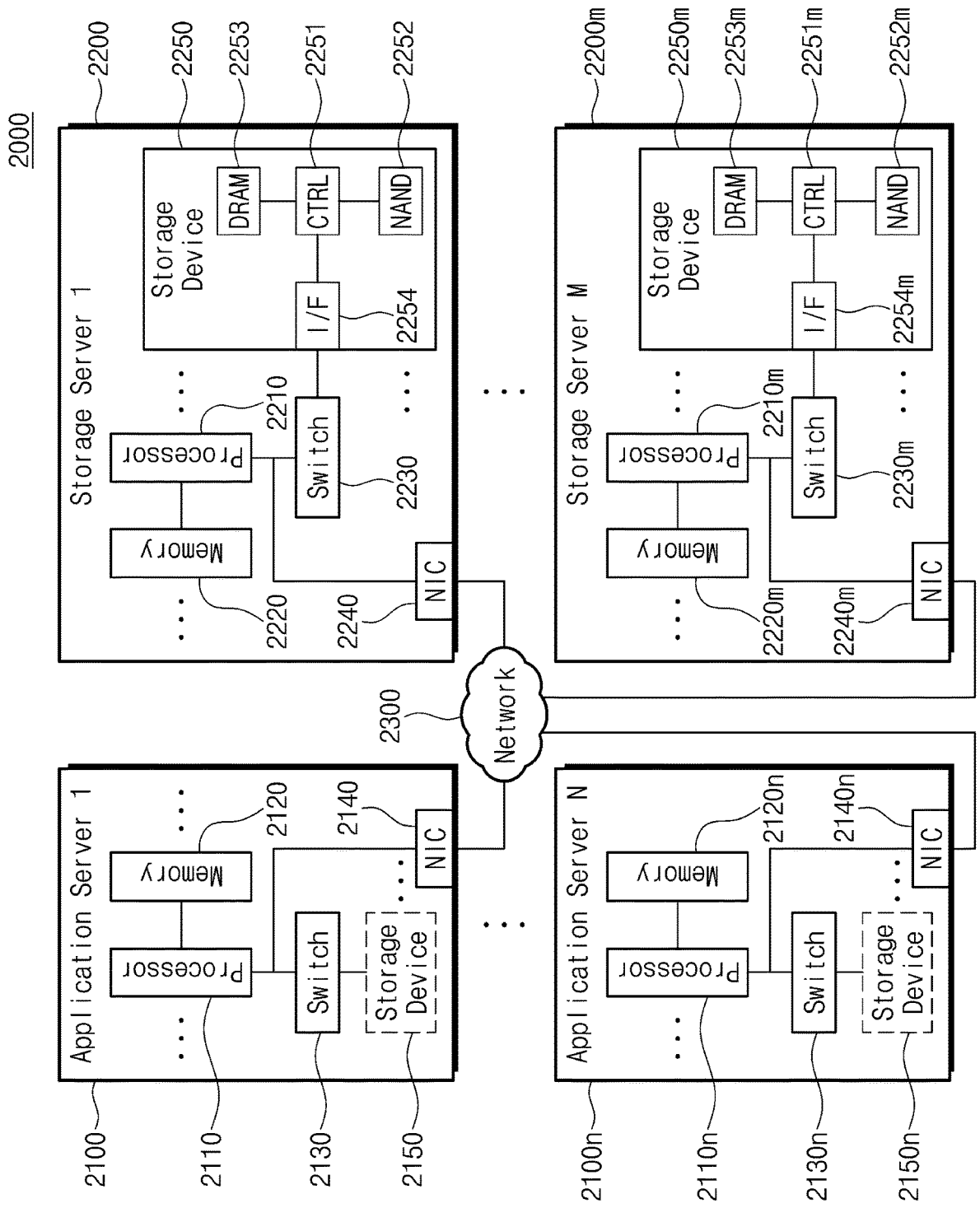
FIG. 14 is a block diagram illustrating a data center to which a memory device according to an embodiment of the present disclosure is applied.

FIG. 14 is a diagram of a data center 2000 to which a memory device is applied, according to an embodiment.

Referring to FIG. 14, the data center 2000 may be a facility that collects various types of pieces of data and provides services and be referred to as a data storage center. The data center 2000 may be a system for operating a search engine and a database, and may be a computing system used by companies, such as banks or government agencies. The data center 2000 may include a number of application servers 2100 to 2100n and a number of storage servers 2200 to 2200m. The number of application servers 2100 to 2100n and the number of storage servers 2200 to 2200m may be variously selected according to embodiments. The number of application servers 2100 to 2100n may be different from the number of storage servers 2200 to 2200m.

The application server 2100 or the storage server 2200 may include at least one of processors 2110 and 2210 and memories 2120 and 2220. The storage server 2200 will now be described as an example. The processor 2210 may control all operations of the storage server 2200, access the memory 2220, and execute instructions and/or data loaded in the memory 2220. The memory 2220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 2210 and memories 2220 included in the storage server 2200 may be variously selected. In an embodiment, the processor 2210 and the memory 2220 may provide a processor-memory pair. In an embodiment, the number of processors 2210 may be different from the number of memories 2220. The processor 2210 may include a single-core processor or a multi-core processor. The above description of the storage server 2200 may be similarly applied to the application server 2100. In some embodiments, the application server 2100 may not include a storage device 2150. The storage server 2200 may include at least one storage device 2250. The number of storage devices 2250 included in the storage server 2200 may be variously selected according to embodiments.

The application servers 2100 to 2100n may communicate with the storage servers 2200 to 2200m through a network 2300. The network 2300 may be implemented by using a fiber channel (FC) or Ethernet. In this case, the FC may be a medium used for relatively high-speed data transmission and use an optical switch with high performance and high availability. The storage servers 2200 to 2200m may be provided as file storages, block storages, or object storages according to an access method of the network 2300.

In an embodiment, the network 2300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 2300 may be a general network, such as a TCP/IP network. For example, the network 2300 may be implemented according to a protocol, such as FC over Ethernet (FCoE), network attached storage (NAS), and NVMe over Fabrics (NVMe-oF).

Hereinafter, the application server 2100 and the storage server 2200 will mainly be described. A description of the application server 2100 may be applied to another application server 2100n, and a description of the storage server 2200 may be applied to another storage server 2200m.

The application server 2100 may store data, which is requested by a user or a client to be stored, in one of the storage servers 2200 to 2200m through the network 2300. Also, the application server 2100 may obtain data, which is requested by the user or the client to be read, from one of the storage servers 2200 to 2200m through the network 2300. For example, the application server 2100 may be implemented as a web server or a database management system (DBMS).

The application server 2100 may access a memory 2120n or a storage device 2150n, which is included in another application server 2100n, through the network 2300. Alternatively, the application server 2100 may access memories 2220 to 2220m or storage devices 2250 to 2250m, which are included in the storage servers 2200 to 2200m, through the network 2300. Thus, the application server 2100 may perform various operations on data stored in application servers 2100 to 2100n and/or the storage servers 2200 to 2200m. For example, the application server 2100 may execute an instruction for moving or copying data between the application servers 2100 to 2100n and/or the storage servers 2200 to 2200m. In this case, the data may be moved from the storage devices 2250 to 2250m of the storage servers 2200 to 2200m to the memories 2120 to 2120n of the application servers 2100 to 2100n directly or through the memories 2220 to 2220m of the storage servers 2200 to 2200m. The data moved through the network 2300 may be data encrypted for security or privacy. The application server 2100 may further include a switch 2130 and a NIC (Network InterConnect) 2140. The switch 2130 may selectively connect the processor 2110 to the storage device 2150 or selectively connect the NIC 2140 to the storage device 2150 via the control of the processor 2110.

The storage server 2200 will now be described as an example. An interface 2254 may provide physical connection between a processor 2210 and a controller 2251 and a physical connection between a network interface card (NIC) 2240 and the controller 2251. For example, the interface 2254 may be implemented using a direct attached storage (DAS) scheme in which the storage device 2250 is directly connected with a dedicated cable. For example, the interface 2254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 2200 may further include a switch 2230 and the NIC (Network InterConnect) 2240. The switch 2230 may selectively connect the processor 2210 to the storage device 2250 or selectively connect the NIC 2240 to the storage device 2250 via the control of the processor 2210.

In an embodiment, the NIC 2240 may include a network interface card and a network adaptor. The NIC 2240 may be connected to the network 2300 by a wired interface, a wireless interface, a Bluetooth interface, or an optical interface. The NIC 2240 may include an internal memory, a digital signal processor (DSP), and a host bus interface and be connected to the processor 2210 and/or the switch 2230 through the host bus interface. The host bus interface may be implemented as one of the above-described examples of the interface 2254. In an embodiment, the NIC 2240 may be integrated with at least one of the processor 2210, the switch 2230, and the storage device 2250.

In the storage servers 2200 to 2200m or the application servers 2100 to 2100n, a processor may transmit a command to storage devices 2150 to 2150n and 2250 to 2250m or the memories 2120 to 2120n and 2220 to 2220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 2150 to 2150n and 2250 to 2250m may transmit a control signal and a command/address signal to NAND flash memory devices 2252 to 2252m in response to a read command received from the processor. Thus, when data is read from the NAND flash memory devices 2252 to 2252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 2251 may control all operations of the storage device 2250. In an embodiment, the controller 2251 may include SRAM. The controller 2251 may write data to the NAND flash memory device 2252 in response to a write command or read data from the NAND flash memory device 2252 in response to a read command. For example, the write command and/or the read command may be provided from the processor 2210 of the storage server 2200, the processor 2210m of another storage server 2200m, or the processors 2110 and 2110n of the application servers 2100 and 2100n. A DRAM 2253 may temporarily store (or buffer) data to be written to the NAND flash memory device 2252 or data read from the NAND flash memory device 2252. Also, the DRAM 2253 may store metadata. Here, the metadata may be user data or data generated by the controller 2251 to manage the NAND flash memory device 2252. The storage device 2250 may include a secure element (SE) for security or privacy.

In an embodiment, each of the storage devices 2150 to 2150n and 2250 to 2250m may be the storage device described with reference to FIGS. 1 to 12, and may be configured to obtain the FRU data based on the operating method described with reference to FIGS. 1 to 12.

According to embodiments of the present disclosure, a storage device connected with a host device through different types of buses may obtain data of an external device connected with the host device.

According to embodiments of the present disclosure, it may be possible to find out the influence of the host device on an error of the storage device by together storing data of the external device obtained by the storage device in a log dump operation of the storage device.

While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A storage device comprising:
   a nonvolatile memory device comprising a first region configured to store user data and a second region not allocated to a user; and
   a storage controller configured to be connected with a host device through both a first-type bus and a second-type bus different from the first-type bus, and configured to receive a first request and a second request from the host device through the first-type bus,
   wherein the storage controller is further configured to perform at least one operation on the nonvolatile memory device in response to the first request,
   wherein the storage controller is further configured to store first data associated with the storage device in the second region in response to the second request, and
   wherein, in response to the second request, the storage controller is further configured to access the second-type bus to obtain second data of at least one external device obtained by the host device and store the second data in the second region.

2. The storage device of claim 1, wherein the first data comprise data associated with an error of the storage device, and
   wherein the second request is a log dump request for storing the second data in the second region.

3. The storage device of claim 2, wherein the at least one operation comprises a read operation, a write operation, a maintenance operation, and/or an erase operation,
   wherein, in response to the second request, the storage controller is further configured to generate a command for storing the first data and the second data in the second region, and
   wherein the command is a write command or a vendor-specific command.

4. The storage device of claim 3, wherein the storage controller is further configured to receive a third request from the host device through the first-type bus, and
   wherein, the storage controller is further configured to read, in response to the third request, the first data and the second data and transfer the first data and the second data to the host device through the first-type bus.

5. The storage device of claim 1, wherein the second data are obtained by a baseboard management controller (BMC) of the host device.

6. The storage device of claim 1, wherein the at least one external device is a field replaceable unit (FRU) configured to be connected with the host device.

7. The storage device of claim 6, wherein the FRU comprises at least one of a fan, a temperature sensor, and a power supplying device of the host device, and wherein the second data comprise data relating to a vendor, a type, and/or a state of the FRU.

8. The storage device of claim 1, wherein the storage device further comprises a peer-to-peer manager configured to process communications between the storage device and another storage device, wherein the storage controller comprises a plurality of interface circuits configured to process communications between the storage controller and an external component, wherein a first one of the plurality of interface circuits is configured to be connected to the host device to provide a data path between the storage device and the host device, and a second one of the plurality of interface circuits is configured to be connected to the peer-to-peer manager to provide a data path between the storage controller and the peer-to-peer manager, and wherein the first-type bus is a peripheral component interconnect express (PCIe) bus and the second-type bus is a system management bus (SMBus) or an inter-integrated circuit (I2C) bus.

9. A storage device comprising:
a nonvolatile memory device comprising a first region configured to store user data and a second region not allocated to a user; and
a storage controller configured to be connected with a host device through both a first-type bus and a second-type bus different from the first-type bus, and configured to receive a first request from the host device through the first-type bus,
wherein the storage controller is further configured to perform at least one operation on the nonvolatile memory device in response to the first request,
wherein the storage controller is further configured to execute a defense code for the storage device,
wherein the storage controller is further configured to, in response to execution of the defense code, store in the second region first data of the storage device associated with the execution of the defense code, and
wherein, the storage controller is further configured to, in response to the execution of the defense code, access the second-type bus to obtain second data of at least one external device obtained by the host device and store the second data in the second region.

10. The storage device of claim 9, wherein the first data comprise data associated with an error of the storage device, wherein the error is configured to cause the execution of the defense code.

11. The storage device of claim 10, wherein the at least one operation comprises a read operation, a write operation, a maintenance operation, and/or an erase operation,
wherein the storage controller is further configured to receive a second request from the host device through the first-type bus, and
wherein the storage controller is further configured to, in response to the second request, read the first data and the second data and transfer the first data and the second data to the host device through the first-type bus.

12. The storage device of claim 9, wherein the defense code comprises at least one of execution of an error correction code (ECC), read reclaim, wear leveling, and garbage collection by the storage controller.

13. The storage device of claim 9, wherein the at least one external device is a field replaceable unit (FRU) configured to be connected with the host device.

14. The storage device of claim 13, wherein the FRU comprises at least one of a fan, a temperature sensor, and a power supplying device of the host device and wherein the second data comprise data relating to a vendor, a type, and/or a state of the FRU, a value indicative of whether the FRU is out of normal operating range, and one or more timestamps indicative of when any of the data has been generated.

15. The storage device of claim 9, wherein the first-type bus is a peripheral component interconnect express (PCIe) bus, and the second-type bus is a system management bus (SMBus) or an inter-integrated circuit (I2C) bus.

16. A storage device comprising:
a nonvolatile memory device comprising a first region configured to store user data and a second region not allocated to a user;
a storage controller configured to be connected with a host device through both a first-type bus and a second-type bus different from the first-type bus, and configured to receive a first request from the host device through the first-type bus; and
a plurality of pins configured to connect the storage controller and the nonvolatile memory device,
wherein the storage controller is further configured to perform at least one operation on the nonvolatile memory device in response to the first request,
wherein the nonvolatile memory device is configured to check a latency of signals received from the storage controller through at least some of the plurality of pins and transfer a check result to the storage controller,
wherein, the storage controller is further configured to, in response to the check result, store in the second region first data of the storage device associated with the latency, and
wherein, the storage controller is further configured to, in response to the check result, access the second-type bus to obtain second data of at least one external device obtained by the host device and store the second data in the second region.

17. The storage device of claim 16, wherein the first data comprise data associated with an error of the storage device due to the latency of the signals being out of an allowable range.

18. The storage device of claim 17,
wherein the at least one operation comprises a read operation, a write operation, a maintenance operation, and/or an erase operation,
wherein the storage controller is further configured to receive a second request from the host device through the first-type bus, and
wherein, the storage controller is further configured to, in response to the second request, read the first data and the second data and transfer the first data and the second data to the host device through the first-type bus.

19. The storage device of claim 16, wherein the at least one external device is a field replaceable unit (FRU) configured to be connected with the host device.

20. The storage device of claim 16, wherein the nonvolatile memory device comprises a pattern checker configured to check a pattern of signals received from the storage controller, generate the check result based on the pattern of signals, and transmit the check result to the storage controller when the check result is indicative of the latency of the signals being out of an allowable range.

* * * * *